Patented May 17, 1927.

1,629,047

UNITED STATES PATENT OFFICE.

ROBERT B. POGUE, OF CHICAGO, ILLINOIS, ASSIGNOR TO THE AMERICAN BRAKE SHOE & FOUNDRY COMPANY, OF NEW YORK, N. Y., A CORPORATION OF DELAWARE.

REFRACTORY LINING.

No Drawing.  Application filed June 6, 1925. Serial No. 35,490.

Although many other kinds of refractory materials have been proposed for lining cupolas, furnaces and ladles, fire brick have long been and are now most generally used. It is found in practice that a brick lining will crack under the heat and then the molten metal works through the cracks and attacks and damages the shells and bowls and casings. When a cupola shell is burned in this way, it is customary to drop the bottom and allow the cupola to cool until the next day when the shell is repaired and the lining replaced. The same procedure is followed in connection with a furnace casing, and a ladle bowl, but it is probable that more trouble, delay and expense is involved in connection with a lining for a cupola than in linings for furnaces and ladle bowls.

I have found it satisfactory to use a mixture consisting of ganister 40%, mica schist 40%, fire clay 20%, with sufficient water to make the mixture of the consistency of dough or putty, which can be easily formed into cakes. Instead of fire clay 20% I may employ fire clay 10% and silica sand 10%, because I have found that the silica sand in the cakes will melt under the heat and form a protective coating over the surface of the liner.

In the use of these cakes for linings the ganister expands and the mica schist contracts and therefore the reaction of one of these elements to heat compensates for the reaction of the other to the heat. The fire clay acts as a binder and the silica sand, if used, produces a protective glazed surface coating over the lining, as before stated. Furthermore, I find that the reaction between the ganister and mica schist overcomes the reaction between the mica schist and the molten metal which has been found to have a detrimental effect upon some castings, forming voids which are objectionable in some castings, but not in others.

In preparing the cakes the different materials are pulverized and, in or about the proportions named, are thrown into a mixer and thoroughly mixed. Water is added and mixing continued until the mass is reduced to proper consistency. Then the mass is removed from the mixer and formed into cakes to facilitate handling. In making cakes the material is rammed into snap flask frames, or other frames or forms and desirably shaped. This ramming or packing in the frames or forms or molds tends to densify the material and reduce the water content. Pneumatically operated rams are commonly employed in foundries and they can be satisfactorily used for packing and densifying the material in the frames or forms or molds. The cakes can be set up damp or green in a cupola and in a furnace but, of course, they can first be dried, and for lining ladles I prefer to employ dried cakes, the drying being accomplished in any approved manner.

My refractory cakes can be easily and economically made and easily set up to form a lining for a cupola, furnace or ladle, or in any other place where such a refractory lining is necessary or desirable. In actual practice I have found that my lining does not crack under the same conditions in which approved brick linings customarily crack and consequently my lining has a longer life and reduces the cost of maintaining cupolas, furnaces, ladles and the like in use and also reduces the cost of operating the same, because the customary stoppages for repair work are to a large extent eliminated.

I have given herein proportions of the various elements which I have found produce satisfactory results, but I do not mean thereby to limit the invention to the exact proportions stated, for I know that variations in these proportions may be employed and I believe those skilled in the art and familiar with foundry practice will readily understand how these proportions can be varied to suit different conditions, which may be found. Therefore, I reserve the right to make all such changes in the proportions and in the manner of making the lining as fairly fall within the scope of the following claim.

I claim:

A refractory lining comprising substantially forty per cent ganister, substantially forty per cent mica schist, and ten to twenty per cent of fire clay, in such proportions that expansion and contraction of the ingredients under heat is compensated.

ROBERT B. POGUE.